(12) United States Patent
Books

(10) Patent No.: US 9,353,718 B2
(45) Date of Patent: May 31, 2016

(54) DRIVEABILITY OF A VEHICLE EQUIPPED WITH START/STOP LOGIC

(71) Applicant: Cummins Inc., Columbus, IN (US)

(72) Inventor: Martin Books, Columbus, IN (US)

(73) Assignee: Cummins Inc., Columbus, IN (US)

( * ) Notice: Subject to any disclaimer, the term of this patent is extended or adjusted under 35 U.S.C. 154(b) by 246 days.

(21) Appl. No.: 14/228,478

(22) Filed: Mar. 28, 2014

(65) Prior Publication Data

US 2015/0275839 A1  Oct. 1, 2015

(51) Int. Cl.
*F02N 11/08* (2006.01)

(52) U.S. Cl.
CPC ......... *F02N 11/0818* (2013.01); *F02N 2200/08* (2013.01)

(58) Field of Classification Search
CPC . F02N 11/08; F02N 11/0811; F02N 11/0814; F02D 41/00; F02D 41/14; F02D 45/00
See application file for complete search history.

(56) References Cited

U.S. PATENT DOCUMENTS

| | | | |
|---|---|---|---|
| 7,083,020 B2* | 8/2006 | Morimoto | B60K 6/485 180/287 |
| 7,099,768 B2 | 8/2006 | Moriya | |
| 7,110,877 B2 | 9/2006 | Ozeki et al. | |
| 7,801,663 B2* | 9/2010 | Denis | F02N 11/0818 123/179.4 |
| 8,260,534 B2* | 9/2012 | Henderson | G01C 21/3697 340/439 |
| 2004/0159479 A1 | 8/2004 | Morimoto et al. | |
| 2009/0055075 A1 | 2/2009 | Denis | |
| 2012/0143468 A1 | 6/2012 | Kim et al. | |
| 2013/0138323 A1 | 5/2013 | Yu et al. | |

FOREIGN PATENT DOCUMENTS

JP    06257483    9/1994

OTHER PUBLICATIONS

KR/International Searching Authority International Search Report and Written Opinion, PCT Application No. PCT/2015/020317, dated Jun. 12, 2015, 14 pgs.

* cited by examiner

*Primary Examiner* — Hieu T Vo
(74) *Attorney, Agent, or Firm* — Taft Stettinius & Hollister LLP

(57) ABSTRACT

Controls for improved drivability of a vehicle equipped with start/stop logic are disclosed. One exemplary embodiment is a method comprising operating a vehicle system including an internal combustion engine and a controller configured to conditionally stop and re-start the engine. The controller tracks the distance that the vehicle has traveled since the most recent vehicle stop and determines a time limit as a function of that distance. The controller further tracks the time that an engine stop request condition has been true, evaluates that time relative to the time limit, and selectably enables or disables an engine stop based upon the relationship between said time and said time limit.

20 Claims, 4 Drawing Sheets

DRIVEABILITY OF A VEHICLE EQUIPPED WITH START/STOP LOGIC

BACKGROUND

The present application relates generally to engine start stop controls. Vehicles equipped with engine start-stop capability can realize significant fuel economy savings by reducing or totally eliminating any engine idling time; however, this capability comes with a number of drawbacks that can negatively impact vehicle driveability. A number of factors are significant for driveability including, for example, the amount of time to bring a stopped engine back on-line not adversely affecting vehicle launch and achieving consistent engine stop and restart behavior for all vehicle stops. Inconvenience and annoyance associated with too-frequent engine stops when the vehicle is in very frequent stop-and-go driving situations are other factors. These driving situations can occur when maneuvering around a parking lot via back and forth shifting between Reverse Gear and Drive (or first gear), rocking a vehicle forward and back to break free from a stuck situation (again, by frequent drive gear reversals between forward and reverse), or very slow stop and go driving situations usually caused by heavy traffic. In each of these cases, driver annoyance is increased if the engine is stopped and restarted each time the vehicle comes to a brief standstill. In some cases (such as rocking out of a stuck condition), the purpose of the shifting maneuver is actually hindered by engine stops and restarts. Existing attempts to account for undesired engine start/stop events suffer from a number of disadvantages and drawbacks. There remains a significant need for the apparatuses, methods and systems disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One exemplary embodiment is a method comprising operating vehicle system including an internal combustion engine and a controller configured to conditionally stop and re-start the engine. The controller tracks the distance that the vehicle has traveled since the most recent vehicle stop and determines a time limit as a function of that distance. The controller further tracks the time that an engine stop request condition has been true, evaluates that time relative to the time limit, and selectably enables or disables an engine stop based upon the relationship between said time and said time limit. Further embodiments, forms, objects, features, advantages, aspects, and benefits shall become apparent from the following description and drawings.

DETAILED DESCRIPTION OF ILLUSTRATIVE EMBODIMENTS

Figure 1:
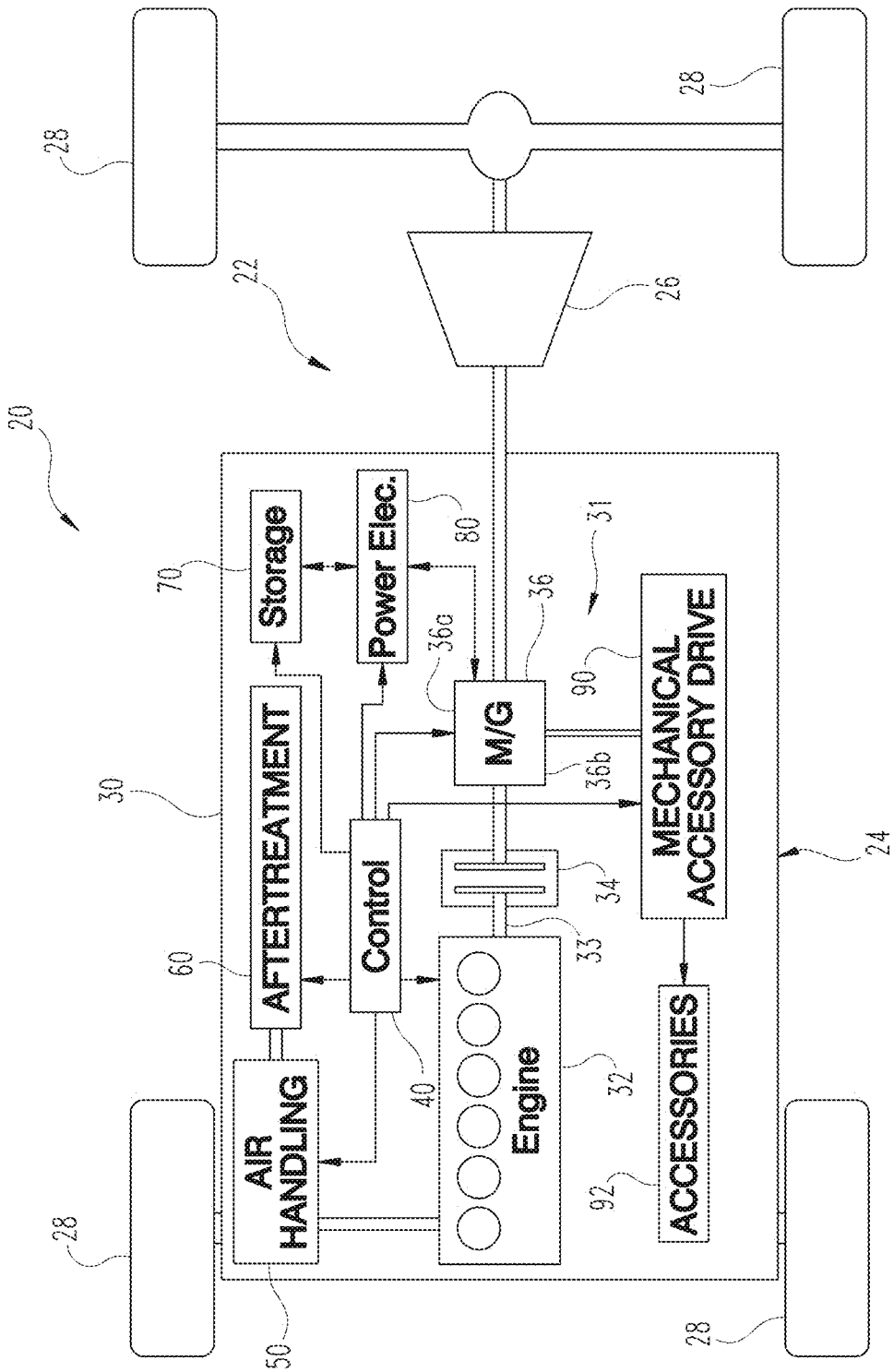
FIG. 1 illustrates a partially diagrammatic view of an exemplary vehicle.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

With reference to FIG. 1 there is illustrated a partially diagrammatic view of a vehicle 20 including an example hybrid powertrain 22. It shall be appreciated that the configuration and components of vehicle 20 and of hybrid powertrain 22 are but one example, and that this disclosure contemplates that a variety of different hybrid and non-hybrid vehicles and powertrain configurations and components may be utilized. Hybrid powertrain 22 includes a hybrid pretransmission hybrid system 24, a transmission 26, and ground engaging wheels 28. Depicted hybrid powertrain 22 system is a series-parallel hybrid (selectable with clutch 34), although the system may be, without limitation, a parallel configuration, a series configuration, and/or a series-parallel hybrid system.

It should be appreciated that in this embodiment, the propulsion of vehicle 20 is provided by the rear wheels 28; however in other applications front wheel drive and four/all wheel drive approaches are contemplated. In one form vehicle 20 is an on-road bus, delivery truck, service truck or the like; however in other forms vehicle 20 may be of a different type, including other types of on-road or off-road vehicles. In still other embodiments it may be a marine vehicle (boat/ship) or other vehicle type. In yet other embodiments, rather than a vehicle, the hybrid power train 22, including the pretransmission hybrid power system 24 is applied to stationary applications, such as an engine-driven generator (a Genset), a hybrid system-driven pump, or the like to name just a few possibilities.

Pretransmission hybrid system 24 includes hybrid power system 30. System 30 includes internal combustion engine 32, clutch 34, motor/generator 36, controller 40, air handling subsystem 50, aftertreatment equipment 60, electrical power storage device 70, electrical power electronics device 80, and mechanical accessory drive subsystem 90. System 30 is in the form of a parallel hybrid power source 31 such that engine 32 and/or motor/generator 36 can provide torque for power train 22 depending on whether clutch 34 is engaged. It should be appreciated that motor/generator 36 can operate as a motor 36a powered by electricity from storage device 70, or as an electric power generator 36b that captures electric energy. In other operating conditions, the motor/generator may be passive such that it is not operating. In the depicted form, motor/generator 36 has a common rotor 37a and a common stator 37b, and is provided as an integrated unit; however in other embodiments a completely or partially separate motor, generator, rotor, stator, or the like may be employed. The designated motor/generator 36 is intended to encompass such variations. Furthermore it should be appreciated that in alternative embodiments of system 30 some of these features, such as air handling subsystem 50, aftertreatment equipment 60, and/or mechanical accessory drive 90 may be absent and/or other optional devices/subsystems may be included.

In certain embodiments the motor/generator 36 may comprise a hydraulic or pneumatic pump rather than an electric motor/generator. It shall be appreciated that references to a motor/generator herein are intended to encompass both electric motor/generators and non-electric motor/generators such as those comprising hydraulic or pneumatic pumps. Furthermore, power storage device 70 of system 30 may comprise one or more electrochemical batteries, supercapacitors or ultracapacitors, or may alternatively store energy in a different, non-electrical medium such as an accumulator found in a hydraulic or pneumatic hybrid system. It shall be appreciated that references to a battery herein are intended to encompass electrochemical storage batteries, other electrical storage devices such as capacitors, and non-electrical energy storage devices such as accumulators utilized in hydraulic or pneumatic hybrid systems.

In the illustrated embodiment, engine 32 is of a four-stroke, diesel-fueled, Compression Ignition (CI) type with multiple cylinders and corresponding reciprocating pistons coupled to crankshaft 33, which typically would be coupled to a flywheel. Crankshaft 33 is mechanically coupled to controllable clutch 34. Engine 32 may be of a conventional type with operation modifications to complement operation in system 30. In other embodiments, engine 32 may be of a different type, including different fueling, different operating cycle(s), different ignition, or the like.

Vehicle 20 further includes a controller 40 which may be configured to control various operational aspects of vehicle 20 and hybrid powertrain 22 as described in further detail herein. Controller 40 may be implemented in a number of ways. Controller 40 executes operating logic that defines various control, management, and/or regulation functions. This operating logic may be in the form of one or more microcontroller or microprocessor routines stored in a non-transitory memory, dedicated hardware, such as a hardwired state machine, analog calculating machine, various types of programming instructions, and/or a different form as would occur to those skilled in the art.

Controller 40 may be provided as a single component, or a collection of operatively coupled components; and may comprise digital circuitry, analog circuitry, or a hybrid combination of both of these types. When of a multi-component form, controller 40 may have one or more components remotely located relative to the others in a distributed arrangement. Controller 40 can include multiple processing units arranged to operate independently, in a pipeline processing arrangement, in a parallel processing arrangement, or the like. In one embodiment, controller 40 includes several programmable microprocessing units of a solid-state, integrated circuit type that are distributed throughout system 30 that each include one or more processing units and non-transitory memory. For the depicted embodiment, controller 40 includes a computer network interface to facilitate communications using standard Controller Area Network (CAN) communications or the like among various system control units. It should be appreciated that the depicted modules or other organizational units of controller 40 refer to certain operating logic performing indicated operations that may each be implemented in a physically separate controller of controller 40 and/or may be virtually implemented in the same controller.

Controller 40 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

The description herein including modules and/or organizational units emphasizes the structural independence of the aspects of the controller, and illustrates one grouping of operations and responsibilities of the controller. Other groupings that execute similar overall operations are understood within the scope of the present application. Modules and/or organizational units may be implemented in hardware and/or as computer instructions on a non-transient computer readable storage medium, and may be distributed across various hardware or computer based components.

Example and non-limiting implementation elements of modules and/or organizational units of the controller 40 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Figure 2:
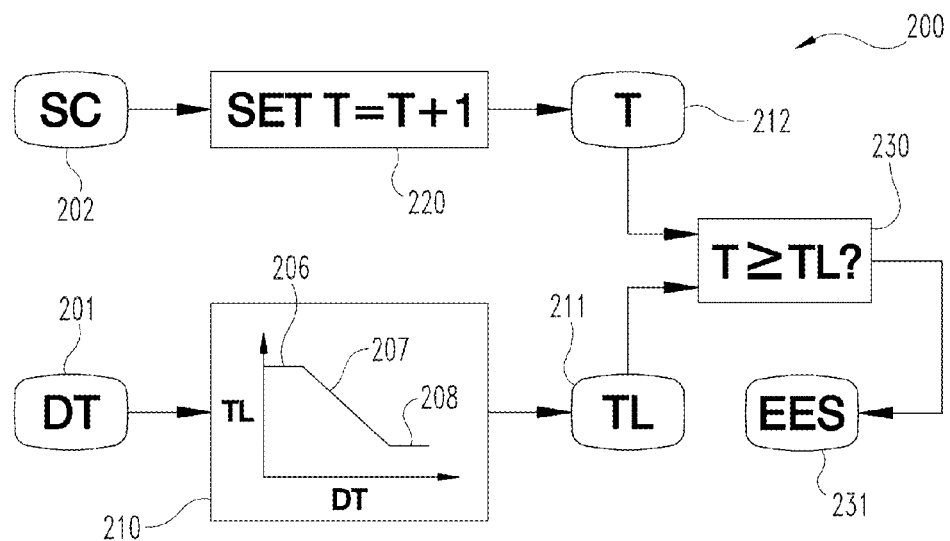
FIG. 2 illustrates a block diagram of exemplary controls logic.

With reference to FIG. 2 there is illustrated a block diagram of exemplary controls logic 200 which may be implemented in a control system, for example, such as a controls system including controller 40 described above in connection with FIG. 1. Controls logic 200 includes a time limit logic block 210 which receives a distance traveled variable 201 as an input and determines a time limit variable 211 as an output based upon one or more predetermined functional relationships between the time limit and the distance traveled. The distance traveled variable 201 may be determined based upon the distance that a vehicle has traveled since any of a most recent engine stop event, a most recent vehicle stop event, or a most recent vehicle launch event.

In the embodiment illustrated in FIG. 2, the predetermined functional relationship between the distance traveled variable 201 and the time limit variable 211 comprises a first linear relationship 206 over a first range of distance traveled, a second linear relationship 207 over a second range of distance traveled, and a third linear relationship 208 over a third range of distance traveled. Additional and alternate functional relationships may also be utilized including, for example, those described below in connection with FIG. 3. It is further contemplated that the predetermined functional relationship implemented by time limit logic block may be varied or modified during operation of the vehicle, as well as during service or reprogramming events.

Controls logic 200 also includes a timer increment block 220 which receives a stop conditions satisfied variable 202 as an input and, increments a timer if variable 202 is true and outputs a timer value variable 212. It shall be appreciated that the term timer includes a real-time timer, a counter, a summation operation or other types of logic. One exemplary timer operates to track the time that an engine stop request condition has been true by starting a timer based upon a vehicle launch event, re-setting the timer after a vehicle stop and re-starting the timer based upon a subsequent vehicle launch event. Start conditions satisfied variable 202 has a logical value indicating that one or more conditions for commanding an engine stop event is either satisfied or not satisfied. A variety of stop conditions may be utilized including, for example, accelerator position, brake pedal position, parking brake state, engine accessories state, aftertreatment system conditions state, energy storage system state, and/or combinations thereof.

The time or count values of variables 211 and 212 are provided to a conditional block 230 which evaluates a relationship between the current timer value and the time limit. In the embodiment illustrated in FIG. 2, conditional block 230 evaluates whether the timer value is greater than or equal to the timer limit value. A number of other conditionals may also be utilized, for example, whether the timer value is greater than, less than, less than or equal to, a predetermined multiple of, or has another predetermined relationship relative to the timer limit value. The logical value resulting from the evaluation performed by conditional block 230 is output as variable 231. When engine variable 231 is true it enables engine stop events and when engine variable 231 is not true it delays engine stop events. It shall be appreciated that the logical states of the controls disclosed herein may be implemented in a variety of forms such as "1/0," "yes/no," "true/not true," "yes/not yes," and "true/false" among others. It shall be further appreciated that while particular logical phrasings have been used herein there is no intent to exclude the alternatives unless indicated to the contrary.

Figure 3:
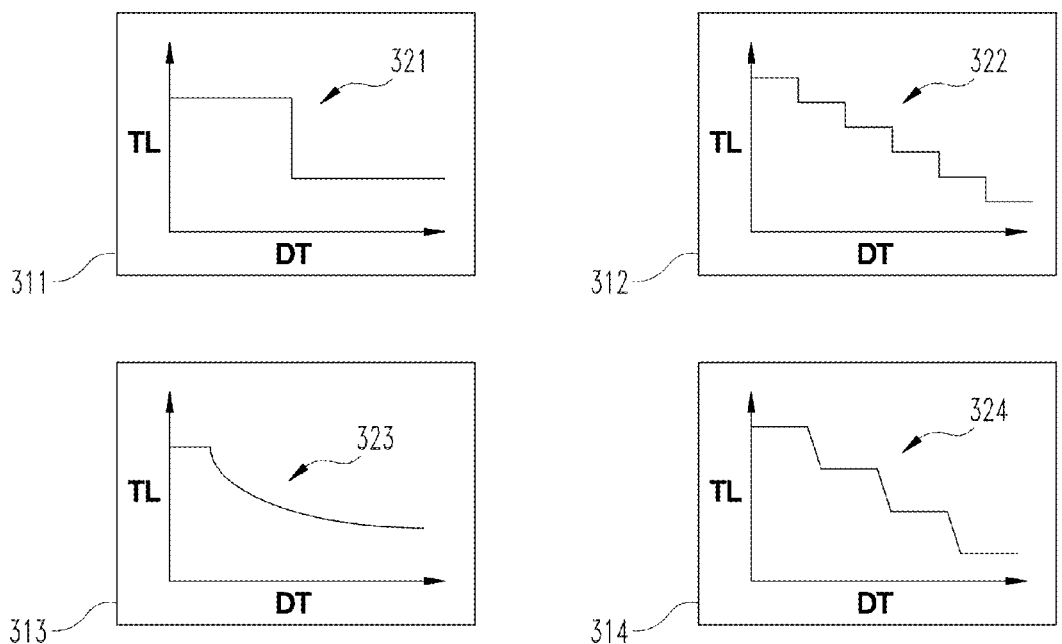
FIG. 3 illustrates block diagrams of exemplary functional relationships between vehicle distance traveled and a time limit.

With reference to FIG. 3 there are illustrated a plurality of additional logic blocks for determining a time limit as a function of a vehicle distance traveled. The function illustrated in block 311 includes a step function relationship 321 between distance traveled and the time limit. The function illustrated in block 312 includes a multi-step or stair-step relationship 322 between distance traveled and the time limit. The function illustrated in block 313 illustrates an exponentially decaying relationship 323 between distance traveled and the time limit. The function illustrated in block 314 illustrates a step ramp functional relationship 324 between distance traveled and the time limit. It shall be appreciated that a variety of other functional relationships may also be implemented as would occur to a person of skill in light of the benefit of the present disclosure.

Figure 4:
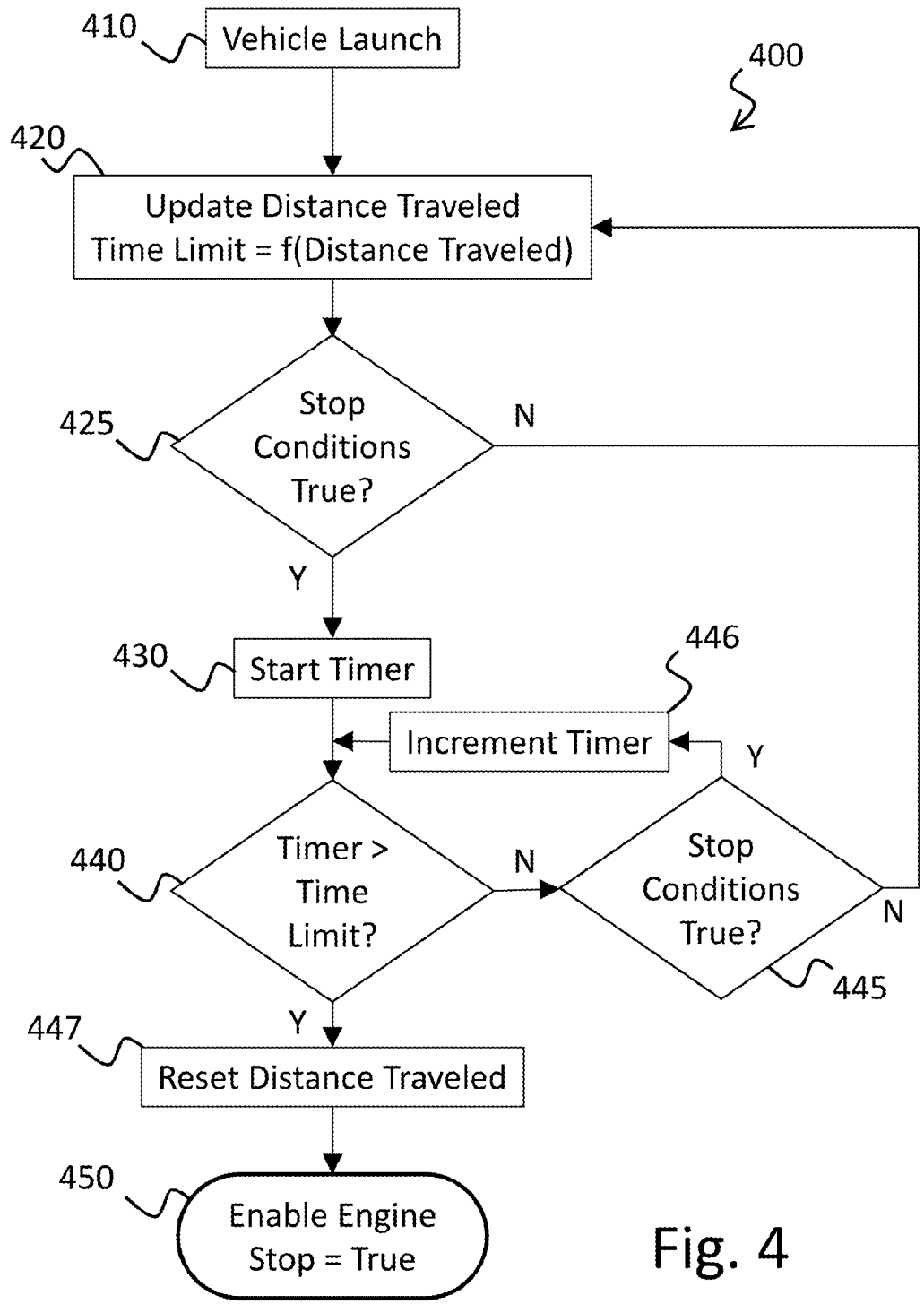
FIG. 4 illustrates a flow diagram according to an exemplary controls process.

With reference to FIG. 4 there is illustrated a flow diagram of an exemplary process 400 for engine start/stop controls. Process 400 begins at vehicle launch event operation 410 at which a vehicle begins to move from a stopped condition. Operation 410 also begins tracking the distance that the vehicle has traveled since the launch event. From operation 410, process 400 proceeds to operation 420 which updates a distance traveled and determines a time limit as a function of the updated distance traveled. From operation 420, operation 400 proceeds to conditional 425.

Conditional 425 evaluates whether one or more engine stop conditions are satisfied, for example, whether all of the necessary conditions for the engine to stop are true. If conditional 425 evaluates false, process 400 returns to operation 420 and may repeat. If conditional 425 evaluates true, conditional 400 proceeds to operation 430 which starts a timer. In the illustrated embodiments the start timer operation will occur only one time per each one stop event although process 400 may repeat over multiple engine stop events each with an associated start time operation. From operation 430, process 400 proceeds to conditional 440 which evaluates whether the value of the timer is greater than or equal to the time limit determined in operation 420. If conditional 440 evaluates false, process 400 proceeds to conditional 445 which evaluates whether one or more stop conditions remain true. If conditional 445 evaluates true, process 400 proceeds to operation 446 which increments the timer value and then proceeds to conditional 440. If conditional 445 evaluates false the timer is aborted and process 400 returns to operation 420 and may repeat.

If conditional 440 evaluates true, process 400 proceeds to operation 447 which resets the distance traveled variable and then proceeds to operation 450 which sets an enable engine stop variable equal to true. It shall be appreciated that the engine stop variable may command an engine to stop or may be utilized in conjunction with additional controls logic to determine whether and when to stop the engine. It shall be further appreciated that process 400 is one example of a process which tracks distance traveled based upon each engine shutdown.

Figure 5:
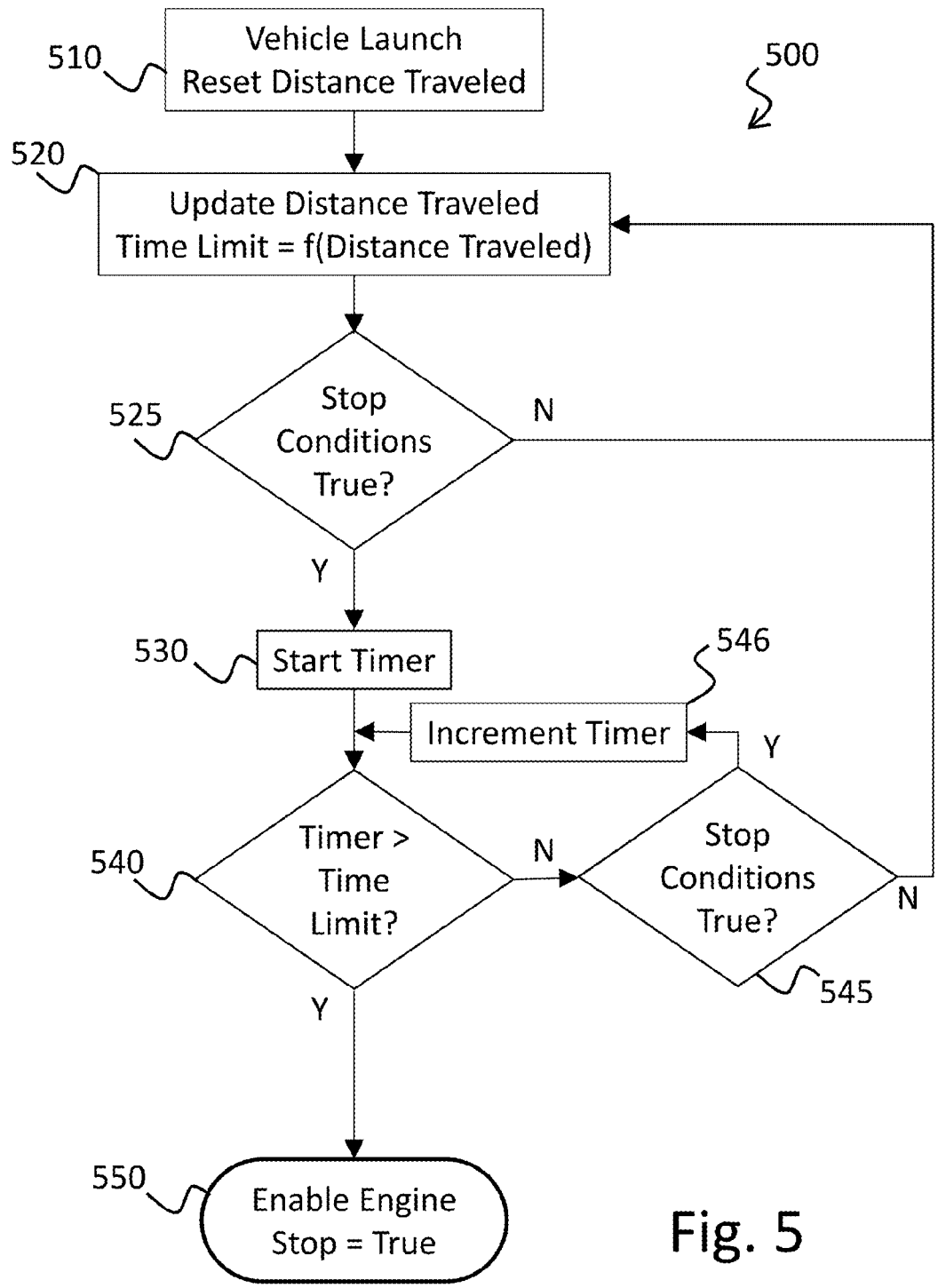
FIG. 5 illustrates a flow diagram according to an exemplary controls process.

With reference to FIG. 5 there is illustrated a flow diagram of an exemplary process 500 for engine start/stop controls. Process 500 begins at vehicle launch event operation 510 at which a vehicle begins to move from a stopped condition. Operation 510 also resets the distance traveled and begins tracking the distance that the vehicle has traveled since the launch event. From operation 510, process 500 proceeds to operation 520 which updates a distance traveled and determines a time limit as a function of the updated distance traveled. From operation 520, operation 500 proceeds to conditional 525.

Conditional 525 evaluates whether one or more engine stop conditions are satisfied, for example, whether all of the necessary conditions for the engine to stop are true. If conditional 525 evaluates false, process 500 returns to operation 520 and may repeat. If conditional 525 evaluates true, conditional 500 proceeds to operation 530 which starts a timer. In the illustrated embodiments the start timer operation will occur only one time per each one stop event although process 500 may repeat over multiple engine stop events each with an associated start time operation. From operation 530, process 500 proceeds to conditional 540 which evaluates whether the value of the timer is greater than or equal to the time limit determined in operation 520. If conditional 540 evaluates false, process 500 proceeds to conditional 545 which evaluates whether one or more stop conditions remain true. If conditional 545 evaluates true, process 500 proceeds to operation 546 which increments the timer value and then proceeds to conditional 540. If conditional 545 evaluates false the timer is aborted and process 500 returns to operation 520 and may repeat.

If conditional 540 evaluates true, process 500 proceeds to operation 550 which sets an enable engine stop variable equal to true. It shall be appreciated that the engine stop variable may command an engine to stop or may be utilized in conjunction with additional controls logic to determine whether and when to stop the engine. It shall be further appreciated that process 500 is one example of a process which tracks distance traveled based upon each vehicle launch.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
operating a vehicle system including an internal combustion engine and a controller configured to conditionally stop and re-start the engine;
tracking with the controller a distance that the vehicle has traveled since a most recent vehicle stopped state;
determining with the controller a time limit as a function of the distance that the vehicle has traveled since the most recent vehicle stopped state;
tracking with the controller a time that an engine stop request condition has been true;
evaluating with the controller said time relative to said time limit; and
wherein the evaluating is effective to conditionally enable or disable engine stop events based upon the relationship between said time and said time limit.

2. The method of claim 1 wherein the time limit has a first linear relationship with the distance traveled over a first range of the distance traveled and a second linear relationship with the distance traveled over a second range of the distance traveled.

3. The method of claim 2 wherein the time limit has a third linear relationship with the distance traveled over a third range of the distance traveled.

4. The method of claim 1 wherein the time limit has a step function relationship with the distance traveled.

5. The method of claim 1 wherein the tracking with the controller the time that an engine stop request condition has been true comprises starting a timer based upon a vehicle stop event, resetting the timer based upon a subsequent vehicle launch event.

6. The method of claim 1 wherein the controller includes a non-transitory computer readable medium configured to store a table defining a predetermined relationship between the time limit and the distance traveled.

7. The method of claim 6 wherein the predetermined relationship comprises a first range defining a first functional relationship and a second range defining a second functional relationship.

8. An apparatus comprising:
an internal combustion engine; and
a control system in operative communication with the internal combustion engine;
wherein the control system is configured to:
store information indicating a distance traveled since a most recent vehicle launch in a non-transitory computer readable medium,
determine a duration target as a function of the distance that the vehicle has traveled since the most recent vehicle launch,
disable engine stop functionality if a duration that an engine stop conditional has been true is less than the duration target, and
enable engine stop functionality if the duration that the engine stop conditional has been true is greater than the duration target.

9. The apparatus of claim 8 wherein the duration targets is determined using a lookup table.

10. The apparatus of claim 9 wherein the lookup table defines a linear relationship between the duration target and the distance traveled.

11. The apparatus of claim 9 wherein the lookup table defines a step function relationship between the duration target and the distance traveled.

12. The apparatus of claim 8 wherein the control system is configured to store the duration that the engine stop conditional has been true in a non-transitory computer readable medium.

13. The apparatus of claim 8 further comprising a vehicle chassis in which the internal combustion engine and the control system are installed.

14. A system comprising:
an engine; and
a control module in operative communication with the engine;
wherein the control module is configured to:
determine a timer requirement value as a function of a distance traveled since a most recent engine stop event,
operate a timer accounting for a time that at least one engine stop condition has been satisfied, and
delay engine stop functionality if the current value of the timer and the timer requirement have a first predetermined relationship.

15. The system of claim 14 wherein the first predetermined relationship comprises a conditional which evaluates whether the current value of the timer is greater than or equal to the timer requirement.

16. The system of claim 14 wherein the control module is further configured to enable engine stop functionality if the current value of the timer and the timer requirement have a second predetermined relationship.

17. The system of claim 16 wherein second predetermined relationship is configured as a conditional which evaluates whether the current value of the timer is less than the timer requirement.

18. The system of claim 14 wherein said function comprises a step function.

19. The system of claim 14 wherein said function comprises a linear function.

20. The system of claim 14 further comprising a vehicle chassis, the engine being coupled with the vehicle chassis to drive a powertrain.

* * * * *